Sept. 6, 1932.   W. N. BOOTH   1,876,393
METHOD OF MAKING WHEEL HUBS
Original Filed April 27, 1925   3 Sheets-Sheet 1
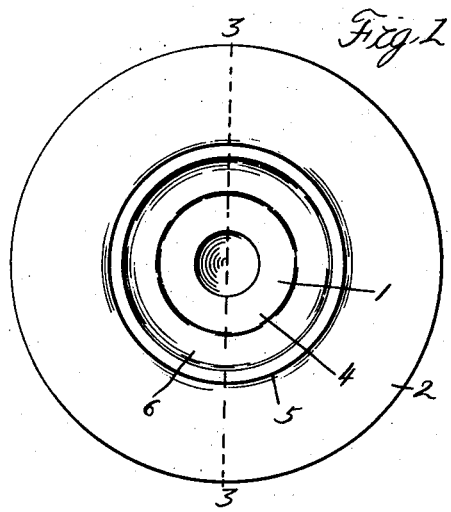
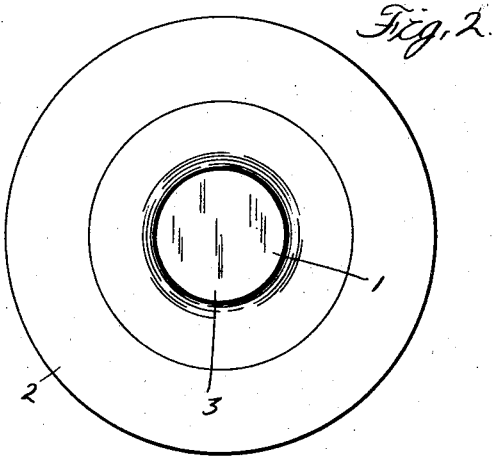
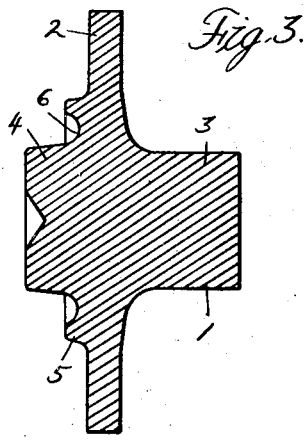
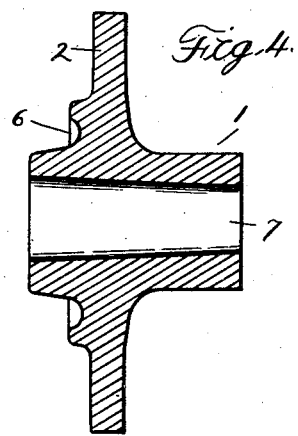
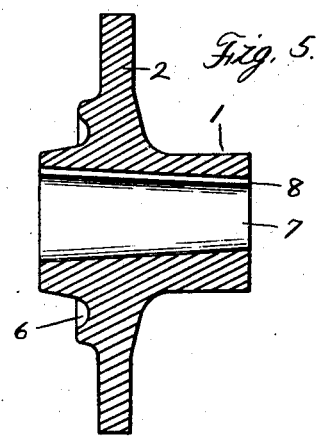
Inventor
William N. Booth Sept. 6, 1932.  W. N. BOOTH  1,876,393
METHOD OF MAKING WHEEL HUBS
Original Filed April 27, 1925    3 Sheets-Sheet 2
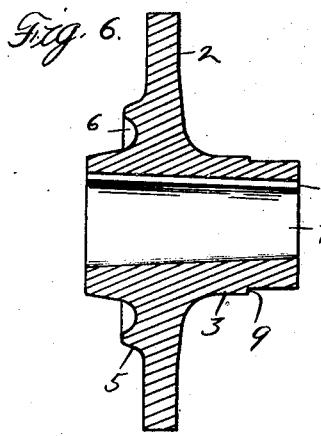
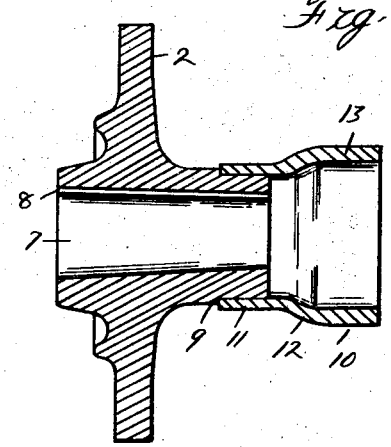
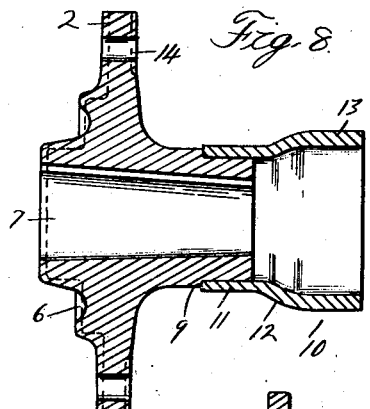
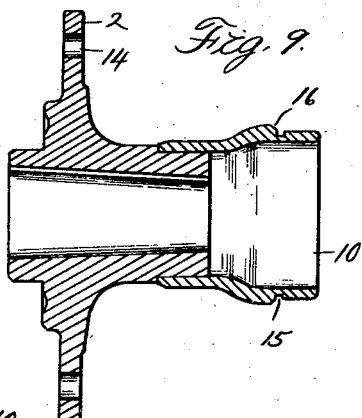
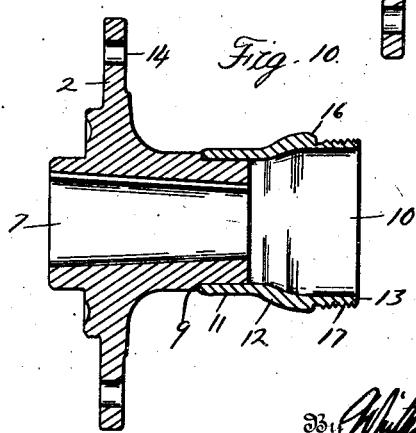
Inventor
William N. Booth Sept. 6, 1932.  W. N. BOOTH  1,876,393
METHOD OF MAKING WHEEL HUBS
Original Filed April 27, 1925  3 Sheets-Sheet 3
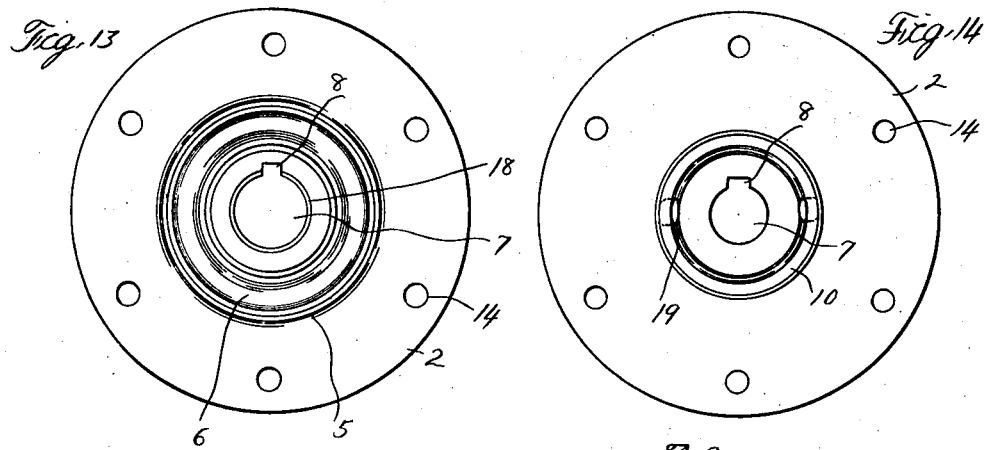
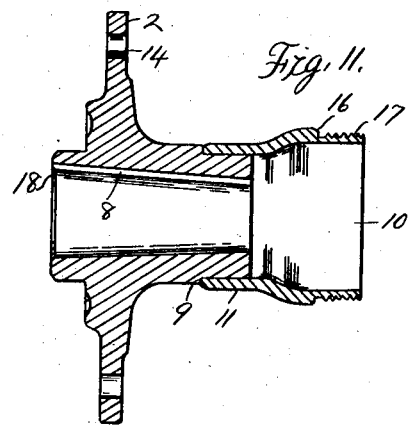
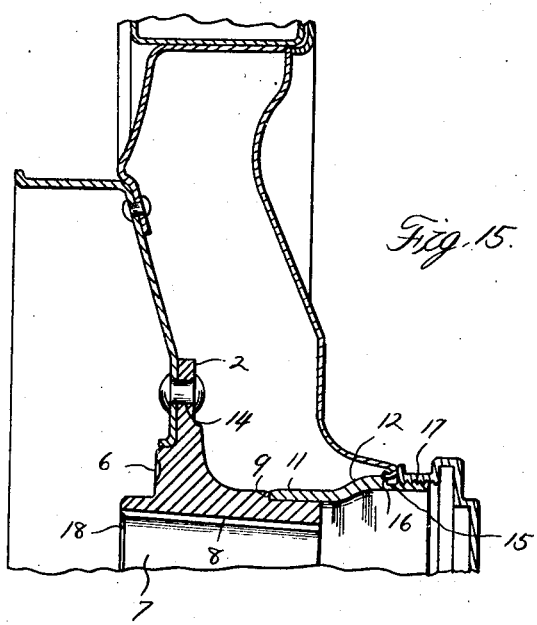
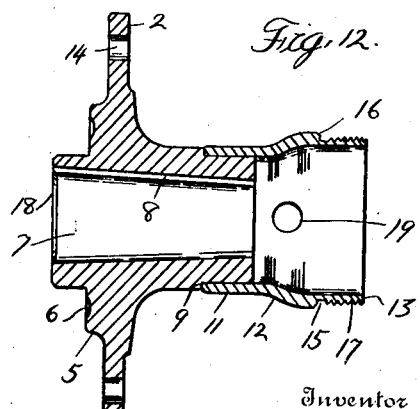
Inventor
William N. Booth
Attorneys Patented Sept. 6, 1932

1,876,393

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

METHOD OF MAKING WHEEL HUBS

Application filed April 27, 1925, Serial No. 26,250. Renewed October 28, 1930.

The invention relates to wheel hubs and refers more particularly to motor vehicle wheel hubs.

Heretofore it has been the usual practice to make the rear wheel hubs different from the front wheel hubs which necessitated different front and rear wheel detachable cover plates or disks. With my invention the rear wheel hub is manufactured with a seat for a wheel cover plate or disk of the same size as the seat of the front wheel hub so that the cover plates or disks of the front and rear wheels may be interchangeable.

Heretofore it has been customary to make the rear wheel hubs of one piece forgings machined to their proper dimensions. With my invention a decided decrease in the required machining may be secured with a consequent saving in time and loss of material and furthermore a decided decrease in weight may be secured.

With these objects as well as other objects in view the invention resides in the novel features as more fully hereinafter set forth.

In the drawings:—

Figures 1 and 2 are opposite end views of a blank from which is formed part of the wheel hub embodying my invention;

Figure 3 is a cross section on the line 3—3 of Figure 1;

Figures 4, 5, 6, 7, 8, 9, 10, 11 and 12 are views similar to Figure 3 and showing the wheel hub during its different stages of manufacture;

Figures 13 and 14 are opposite end views of the wheel hub shown in Figure 12.

Figure 15 is a transverse section through a motor vehicle wheel with the wheel hub embodying my invention applied.

In general my invention consists in forming the rear wheel hub with a seat for the wheel cover plate or disk of the same size as the seat of the front wheel hub so that the cover plates or disks may be interchangeable. Furthermore I form the wheel hub of a forged member and a drawn member, which are secured to each other and so arranged that the total weight of the wheel hub is less than that of a wheel hub formed entirely of a forging and the amount of machining required is materially decreased thereby saving considerable material and labor.

In forming my wheel hub I start with a forged blank which as shown in Figures 1, 2 and 3 particularly comprises the barrel 1 and the radial annular flange 2 extending from the barrel intermediate its inner and outer barrel portions 3 and 4 respectively. The barrel 1 is solid and the annular flange 2 has upon its front side the cylindrical shoulder 5 concentric with the axis of the barrel and the annular groove 6 concentric with and of smaller diameter than the shoulder 5.

As shown in Figure 4 the barrel 1 of the forged blank is axially drilled and reamed to form the opening 7 which tapers inwardly. After the drilling and reaming step the barrel 1 is broached to form the key way 8 extending longitudinally of and opening into the opening 7, as shown in Figure 5.

Figure 6 shows the wheel hub blank after the next step has been performed. This step consists in machining the periphery of the barrel portion 3 and facing its end, sufficient material being removed from the periphery and inwardly from its end to form the annular shoulder 9 which is located approximately midway between the inner end of the barrel and the inner face of the annular flange 2.

The barrel 1 is of such length that it affords sufficient bearing upon the axle to provide a strong construction. However, this barrel is not as long as the barrel of the corresponding wheel hub as customarily made heretofore. To complete the wheel hub and to make the barrel thereof of the proper length and at the same time to provide a seat upon the barrel for a wheel cover plate or disk of the same size as the seat of the front wheel hub I have formed the sleeve 10 of drawn steel and having the portion 11 of an internal diameter such that it may be shrunk upon the reduced portion of the barrel portion 3 and abut the shoulder 9 thereof. This sleeve also has the flaring intermediate portion 12 connecting the portion 11 with the portion 13, the latter being of greater diameter than the former. Figure 7 shows the wheel hub blank after the sleeve has been secured to the forging.

As shown in Figure 8 the next step consists in drilling the angularly spaced openings 14 in the radial flange 2 of the forged blank.

The forged blank and drawn sleeve are then finished by suitable machining operations to produce the article shown in Figure 9. It will be noted that the forged blank has had all of that material removed outside the dotted lines shown in Figure 8. It will also be noted that the openings 14 have been finished and the periphery and end of the drawn sleeve have been finished. The enlarged portion 13 of the sleeve has a portion of its periphery removed and is provided with the annular groove 15. Also the periphery inwardly of and adjacent to this annular groove is made flaring to form the seat 16 for engaging the wheel cover plate or disk. This seat as shown particularly in Figure 15 is of such a diameter that it is adapted to receive the same wheel cover plate or disk that the front wheel hub is adapted to receive. In other words, my rear wheel hub is manufactured so that interchangeable front and rear wheel cover plates or disks may be mounted thereon.

As shown in Figure 10 the portion 13 of the sleeve is then externally threaded at 17.

The next step consists in chamfering the outer end of the barrel 1 at 18 as shown in Figure 11.

The final step consists in drilling the diametrically opposite holes 19 in the sleeve 10, the completed hub then having the form shown in Figures 12, 14 and 15.

What I claim as my invention is:

1. The manufacture of a wheel hub which comprises the forming of a forging having a barrel and a radially extending annular flange, the machining of the barrel to reduce a portion of its diameter, the drawing of a sleeve to form a portion adapted to engage over the portion of reduced diameter of the barrel and also to form a portion of greater diameter, the shrinking of the first mentioned portion of the sleeve upon the reduced portion of the barrel and the machining of the portion of greater diameter of the sleeve to form an annular shoulder thereon.

2. The forming of a wheel hub which comprises the forging of a body having a barrel and a radially extending annular flange, the axial boring of the barrel to form an opening therethrough for engagement by a shaft, the machining of a portion of the barrel to reduce its external diameter and form an annular shoulder, the drawing of a sleeve having a portion adapted to engage the reduced portion of the barrel and a portion of greater diameter, the shrinking of the first mentioned portion of the sleeve upon the reduced portion of the barrel and against the annular shoulder, and the machining of the portion of greater diameter of the sleeve to form an annular flared seat intermediate its ends and external threads between the seat and one end.

3. The method of forming a wheel hub which comprises, the forming of a body with a barrel and a flange, the forming of an annular shoulder on the barrel intermediate the ends thereof, the forming of a sleeve with a portion adapted to engage over one end of the barrel and with another portion of greater diameter than the portion aforesaid, the securing of the sleeve to the barrel with the reduced end portion thereof abutting said shoulder and the forming of an annular seat upon the portion of greater diameter of the sleeve.

4. In the manufacture of motor vehicle front and rear wheels including cover plates or discs and hubs having seats for the cover plates or discs which comprises, providing interchangeable cover plates or discs, providing an extension for one of the hubs, and providing a seat on the extension corresponding to that of the other hub for alternative engagement by the cover plates or discs.

5. In the manufacture of motor vehicle front and rear wheels including cover plates or discs and hubs having seats for the cover plates or discs which comprises, forming interchangeable cover plates having the same diameter of central opening, forming a sleeve, securing one end of the sleeve to one of the hubs in axial alignment therewith to form an extension therefor, forming a seat upon the sleeve having the same diameter as the seat on the other hub for alternative engagement by the cover plates or discs.

6. In the manufacture of motor vehicle front and rear wheels including cover plates or discs and hubs of different sizes having seats for the cover plates or discs which comprises, forming interchangeable cover plates having the same diameter of central opening, forming a sleeve, securing one end of the sleeve to one of the hubs to form an extension therefor and forming a seat upon the sleeve having the same diameter as the seat on the other hub for alternative engagement by the cover plates or discs.

7. Those steps in the method of manufacturing a wheel hub which consists in forming a body with a barrel, reducing one end of the barrel to provide an annular shoulder, forming a sleeve with one end portion of greater diameter than the barrel, shrinking the opposite end of the sleeve upon the reduced end of the barrel in abutting relation to said shoulder and forming a seat upon the portion of greater diameter of the sleeve.

8. A wheel hub comprising a metal body having a barrel provided with a reduced end portion forming an annular shoulder and a metal sleeve extending axially of said barrel said sleeve having a reduced portion permanently secured upon the reduced end of said barrel in abutting relation to said shoulder and having an enlarged portion provided with an annular shoulder beyond said barrel.

In testimony whereof I affix my signature.

WILLIAM N. BOOTH.